United States Patent [19]

Lee

[11] 4,145,321

[45] Mar. 20, 1979

[54] PRESSURE-SENSITIVE ADHESIVE COMPOSITIONS AND PROCESS FOR PREPARING THEM

[75] Inventor: Cedric Lee, Harlow, England

[73] Assignee: Revertex Limited, Harlow, England

[21] Appl. No.: 851,563

[22] Filed: Nov. 14, 1977

[51] Int. Cl.² .......................... C08F 8/46; C08L 93/00; C09J 7/02

[52] U.S. Cl. .......................... 260/27 BB; 260/29.7 T; 260/31.8 DR; 427/207 B; 526/56

[58] Field of Search ............... 260/27, 27 BB, 29.7 T, 260/31.8 DR; 526/272, 31.8, 887, 29.6, 56; 427/207 B

[56] References Cited

U.S. PATENT DOCUMENTS

| | | | |
|---|---|---|---|
| 2,829,130 | 4/1958 | Greenspan et al. | 526/56 |
| 2,829,135 | 4/1958 | Greenspan et al. | 526/56 |
| 2,844,502 | 7/1958 | Paxton | 526/56 |
| 3,546,184 | 12/1970 | Heidel et al. | 526/56 |
| 3,743,616 | 7/1973 | Kest | 260/31.8 DR |
| 3,778,418 | 12/1973 | Nakayma | 526/56 |
| 3,917,551 | 11/1975 | Jurrens et al. | 260/27 BB |
| 3,974,129 | 8/1976 | De La Mare | 526/56 |
| 4,080,493 | 3/1978 | Yasui et al. | 526/56 |
| 4,082,817 | 4/1978 | Imaizumi et al. | 526/56 |

FOREIGN PATENT DOCUMENTS

| | | | |
|---|---|---|---|
| 2262677 | 9/1975 | France | 526/56 |
| 952021 | 3/1964 | United Kingdom | 526/56 |

*Primary Examiner*—Ronald W. Griffin
*Attorney, Agent, or Firm*—Sughrue, Rothwell, Mion, Zinn and Macpeak

[57] ABSTRACT

A pressure-sensitive adhesive composition with a low content of volatile liquids, such as organic solvents or water, comprises a maleinized liquid polybutadiene blended with one or more tackifying resins and one or more curing agents, suchas a blocked polyamine, the composition containing less than 20% by weight of volatile liquids. The liquid polybutadiene, which can be made by any conventional polymerization mechanism, is maleinized by reaction with meleic anhydride, and it is convenient to add the tackifying resin and any other ingredients of the composition to the maleinized liquid polybutadiene just after the maleinization reaction.

29 Claims, No Drawings

PRESSURE-SENSITIVE ADHESIVE COMPOSITIONS AND PROCESS FOR PREPARING THEM

This invention relates to pressure-sensitive and tacky adhesive compositions which contain less than about 20 percent by weight of volatile substances, such as organic solvents or water. This invention also relates to a process for preparing such adhesive compositions.

The present adhesive compositions may be formulated to exhibit high tack, holding power, bond strength and shear strength when applied to suitable substrates and to be particularly suitable for pressure-sensitive tapes and labels, or to be suitable for other purposes such as forming structural joints, for seals and for lamination.

Pressure-sensitive adhesives have typically been prepared previously be blending one or more high molecular weight natural or synthetic elastomers with tackifying substances which may be either polymeric or non-polymeric in nature (although certain high molecular weight polymers exhibit sufficient tack and adhesion without the need for such additions). Other substances may also be present, such as curing agents which serve to cross-link or to enhance the molecular weight of the polymer or polymers present; antioxidants; biocides; odorants; inert fillers or extenders which may be either organic, such as oils and waxes, or inorganic, such as mineral fillers.

By reason of the high molecular weight of certain of such polymeric ingredients, in order to apply the adhesive composition to substrates in a convenient manner it is usually necessary to apply the composition either in solution in a volatile organic solvent or in the form of an aqueous dispersion and to cause the solvent or water to evaporate.

Previously, solutions in organic solvents have been generally preferred for pressure-sensitive adhesive formulations since solution-based compositions generally yield the best balance of adhesive properties. Unfortunately the use of volatile organic solvents presents many difficulties, such as high cost, fire and explosion hazards, toxicity hazards and the generation of odors, and these difficulties must be solved for the sake of safety and to avoid environmental pollution. The use of solvent recovery systems after evaporation of the solvents in industrial operations is becoming mandatory to an increasing extent, but such systems are costly to instal and to operate and may be relatively inefficient with respect to recovery of usable solvent. Further, it is an expensive and time-consuming operation to dissolve solid high-molecular weight polymers in organic solvents and it is generally necessary in any case to subject the elastomeric polymer (such as natural rubber) to degradation, for example by mechanical action, in order to obtain solutions which do not exhibit an excessive viscosity. Of course it is possible to prepare certain suitable synthetic polymers by polymerisation in an organic solvent originally, but such solvents are generally unsuitable for inclusion in the final adhesive.

Therefore, in order to avoid the disadvantages of preparing and using solvent-based adhesives, pressure-sensitive tacky adhesives have sometimes previously been prepared and applied in the form of aqueous dispersions or latices which are dried to form an adhesive layer. However, in order to prepare such compositions it is necessary either to prepare dispersions of liquid or solid tackifying substances such as resins for blending with a latex of an elastomeric polymers (such as natural rubber latex) or to prepare the emulsion polymerization latex polymers which exhibit the necessary adhesive properties. In the former case it may be difficult to achieve a satisfactory dispersion of the tackifying substance, restricting the selection to those which can be dispersed economically, and in any case the procedures require the expenditure of energy. In the latter case the selection is restricted to polymers of those monomers which can be polymerized using suitable recipes in aqueous emulsion. In the use of these aqueous pressure-sensitive adhesive compositions, the presence of water-soluble constituents such as emulsifiers, stabilizers and thickeners detracts from the adhesiveness and tack of the dry adhesive layer.

According to one aspect of the present invention there is provided a pressure-sensitive adhesive composition, wherein the composition comprises a maleinized liquid polybutadiene (as hereinafter defined) blended with one or more solid tackifying resins and one or more curing agents, the composition containing less than 20% by weight of volatile liquids.

The volatile liquids of which the composition contains less than 20 percent by weight are volatile liquids, such as organic solvents or water. After the composition has been applied to a substrate and cured, a tacky pressure-sensitive adhesive layer is obtained.

Another aspect of the present invention provides a process for preparing a pressure-sensitive adhesive composition, wherein a liquid polybutadiene is maleinized (as hereinafter defined) and the maleinized liquid polybutadiene is blended with one or more solid tackifying resins and one or more curing agents to form a composition containing less than 20% by weight of volatile liquids.

In a modification of this process, the liquid polybutadiene is maleinized in the presence of some or all of the tackifying resin(s), whereafter the remainder, if any, of the tackifying resin(s) and the curing agent(s) and catalyst(s), if any, are blended with the maleinized material.

The present compositions may be applied at or near ordinary ambient temperatures onto a substrate, and the application of even a moderate quantity of heat converts the composition into its final form imparting a good bond and adequate cohesive strength. The compositions are sufficiently fluid not to require the use of large proportions of volatile organic solvents or diluents at or near ordinary ambient temperatures and have an adequate storage life at such temperatures without the risk of problems of premature curing, such as thickening.

Whereas polymers which are liquid or which exhibit a low viscosity have been utilized in previously proposed solution or emulsion adhesive systems essentially as auxiliaries in order to impart tack, fluidity and other properties, and a high molecular weight elastomeric or resinous polymer is relied upon in order to obtain the necessary final bond strength, in the present composition and process we use a reactive polybutadiene initially of low molecular weight, both as the principal solvent of carrying medium for a tackifying constituent and in order to obtain a high final bond strength by reason of its susceptibility to curing.

The various constituents of the present compositions and starting materials of the present process will now be discussed in greater detail.

LIQUID POLYBUTADIENE

Liquid butadiene polymers can be made by any conventional polymerization mechanism, such as free radical, anionic, cationic or co-ordination complexing polymerization.

The use of a free-radical polymerization mechanism permits the introduction of a wide variety of other comonomer units at random into the polymer, for example by copolymerization with styrene or acrylonitrile or with esters of unsaturated carboxylic acids, and an efficient and convenient method of obtaining liquid polybutadiene is by anionic polymerization using organolithium compounds as initiators in anhydrous organic solvents.

The liquid compolymers of butadiene which can be used in the present process also include those the macromolecules of which contain a minor proportion of units derived from other copolymerizable monomers distributed at random. The nature of the comonomer or comonomers which can be copolymerized successfully to form the liquid copolymer depends upon the polymerization mechanism, and the selection of the nature and proportion of comonomers is dictated by the effect on the subsequent processing necessary to form the present products. Comonomers containing labile hydrogen atoms present in such groups as hydroxyl and amino are decidedly undesirable, but a minor proportion of carboxyl groups may be present, in an amount not exceeding 5 units per every 100 monomer units.

End-groups containing labile hydrogen atoms may be present at one or both ends of the macromolecules of the liquid polymer or copolymer of butadiene, again dependent upon the mechanism of polymerization and the origin of these end-groups, for example, whether they originate from the initiators used or from reactions after polymerization is completed and before the polymer is isolated from the medium in which polymerization has been conducted. If these end-groups are carboxyl, their presence at both ends of the macromolecule will not interfere with subsequent processing.

Any other labile hydrogen-containing end-groups should be present at only one end of the macromolecule of liquid butadiene polymer or copolymer.

The liquid butadiene polymers useful in preparing the present compositions preferably have an average molecular weight in the range of 500 to 20,000, more preferably in the range of 1,000 to 10,000. These molecular weights may be determined by absolute methods, such as osmometry or light scattering, or by relative methods, such as gel permeation chromatography with application of appropriate calibration data. In any case a mean value will be obtained, reflecting the distribution of molecular weights of individual macromolecules. This distribution may be either quite narrow or quite broad depending upon the method of polymerisation or whether a blend was made of different preparations, but it is preferably that the molecular weight distribution be as narrow as possible.

The viscosity of the liquid polybutadiene will vary according to well-known factors, such as the mean molecular weight, the molecular weight distribution, the microstructure, macrostructure, nature and proportion of comonomer. For example, for a given molecular weight, assuming the existence of a narrow distribution of molecular weights, and assuming the polymer to be linear, the viscosity increases as the proportion of vinyl units in the polymer increases. It is highly desirable that the polymer should be as fluid as possible since the viscosity increases in every case after maleinization; accordingly it is preferred that the microstructure should comprise at least 45% of the units in the 1,4-configuration. However, polymers containing as much as 90% or more units in the vinyl or 1,2-configuration may be used, provided that the viscosities are sufficiently low for convenient processing of the final composition. The microstructure obtained varies according to the polymerization recipe and the polymerization mechanism. Cured maleinized liquid polybutadienes containing a predominant proportion of 1,4-units also exhibit the advantage of higher flexibility compared with those containing a predominant proportion of 1,2-units.

With respect to the macrostructure, the polymer may be linear or randomly branched or comprise molecules linked at one end into a radial or star configuration. Preferably, the polymer should not contain more than about 10% polymer infinitely cross-linked into a network. For a given molecular weight and microstructure, the viscosity falls as the number of branches increases. In any case the polymer should be such that it does not infinitely cross-link during the subsequent maleinization reaction.

As an indication the viscosity range of polymers used in preparing the present compositions is from 2 to 2,500 poise at 50° C., preferably in the range 5 to 500 poise. The presence of copolymerized styrene units and of most other monomers tends to increase the viscosity of the liquid polybutadiene; hence it is preferred that such units be absent from the polymer although such copolymers may be used.

MALEINIZED LIQUID POLYBUTADIENE

The reaction between liquid polybutadiene and maleic anhydride is well known although of uncertain chemistry. This reaction is termed "maleinization" in this specification for the sake of convenience and the product of the reaction is termed "maleinized liquid polybutadiene." In this reaction, the maleic anhydride units are added randomly to the polymer, the anhydride structure being retained intact so long as ring-opening substances are excluded.

The conditions are conventional, requiring elevated temperatures of, for example, 190° C. over a period of for example about 4 hours or 180° C. for about 5 hours in the absence of oxygen. Any liquid solvent, diluent or plasticizer, which is required in the final composition in order to reduce its viscosity, may conveniently be present during maleinization in order to maintain the reactants in a fluid condition and to help exclude oxygen, but such a substance should preferably be chemically inert towards the anhydride structure during maleinization. It is usually necessary to add a small proportion, say less than 1% by weight, for example, of a hindered phenol, in order to obviate cross-linking, and catalysts for maleinization may also be included.

The amount of maleic anhydride added is generally sufficient to provide from 1 to 6 anhydride groups per polybutadiene macromolecule, preferably from 1 to 3.

After the maleinization is complete, the reactants are cooled. It is convenient to add the tackifying resin and any other inert constituents to the warm maleinized liquid polybutadiene just after the maleinization step while the viscosity is still low.

TACKIFYING RESINS

The proportion of tackifying resin used to prepare the present compositions may amount to from 5 to 75% by weight of the final composition, the preferred range being 25 to 55%. The actual quantity used in a given composition will depend upon such factors as the nature of the tackifying resin selected; the properties of the particular maleinized polybutadiene; the compatability of these two components (which in turn will depend on the proportion and nature of other components present such as volatile solvents, diluents and plasticizers); the required viscosity of the final composition before curing; the physical properties required of the final adhesive after curing, such as tack, shear strength or peel strength.

Tackifying resins are usually solids at ordinary temperatures in the absence of solvents or impurities, and there are various types of tackifying resins which may be employed, examples of such tackifying resins being as follows:

Polyterpenes

"Nirez" 1085 (Reichhold Chemicals Inc.) "Arkon" P115 (Arakawa Forest Co.)
"Zonarez"* 7100 (Arizona Chemical Co.)
"Piccolyte"* S (Pennsylvania Industrial Chemical Corp.)
*Registered Trade Mark

Petroleum hydrocarbons

"Eastorez" 100 (Eastman Chemicals Co.)
"Escorez" 5280 (Esso Chemical Co.)
"Imprez" T85 (I.C.I. LTD.)

Low Molecular Weight Polystyrene

"Piccolastic" A50 (Pennsylvania Industrial Chemical Corp.)
"Piccotac" C. (Pennsylvania Industrial Chemical Corp.)

Hydrogenated rosin esters

"Stabelite" Ester 3 (Hercules Powder Co.)

Polybutenes

"Hyvis" (B.P. Chemicals Ltd.)
"Indopol" H300 (Amoco Chemicals Corp.)

Aromatic/aliphatic copolymers

"Klyrvel" 30, "Klyrvel" 60 and "Klyrvel" 75 (all Velsicol Chemical Corp.)

In addition to the need for compatability previously mentioned, it is necessary that the tackifying resin should be relatively chemically inert towards the maleinized liquid polybutadiene and towards the curing agents.

Those resins which are solid at ordinary ambient temperatures may for convenience in processing be dissolved in an inert solvent, diluent or plasticizer before addition to the maleinized liquid polybutadiene. This procedure may obviate the need altogether to heat the maleinized polybutadiene and/or the tackifying resin in order to facilitate mixing.

Further, if the curing agent is of the heat-activatable type, it may be more convenient to dissolve it in either the maleinized liquid polybutadiene or in the tackifying resin before these two components are mixed.

Curing Agent and Catalyst

Curing agents which are suitable for the maleinized liquid polybutadiene contain at least two reactive hydrogen atoms per molecule and are capable of reacting to form a cross-link between polybutadiene macromolecules. The hydrogen atoms are preferably attached to different carbon atoms in the molecule of the curing agent, for the sake of superior reactivity.

Suitable curing agents include amines, especially polyamines; polyols; amides, especially polyamides; alkanolamines; and alkanolamides.

Alternatively, a polyepoxide may be used, but in such a case it is desirable that an epoxide ring- or carboxylic anhydride ring-opening compound should be present for the sake of enhanced reaction rate.

A curing catalyst for the curing reaction may also be present, the purpose of the curing catalyst generally being to activate the curing agent. Thus where, in order to ensure long pot-life for the present composition, the curing agent is present in an inactive form which can be activated by, for example, heat, the curing catalyst may serve to reduce the temperature at which the curing agent is activated, and may be added separately when the composition is used. In certain circumstances, water or ambient moisture may act as a curing catalyst, other examples of such catalysts being acids or bases which may be "blocked" so as to be inert at ordinary temperatures.

The combined curing system including liquid maleinized polybutadienes, curing agent and catalyst (if any) should be designed to be relatively inactive at ordinary temperatures over the storage period required. Thus if a lengthy storage period is required, a catalyst should be used which is activated at elevated temperatures. Alternatively, a catalyst which promotes cure rapidly at ordinary temperatures may be employed, in which case the adhesive will be applied soon after adding the catalyst. The conditions of use available will dictate the formulation of the curing system.

A particularly useful curing agent in the present process is a so-called "blocked" polyamine, that is to say an amine in which the amine function is temporarily blocked or stabilized by reaction with another compound which can be released under the action of heat or heat and moisture to regenerate the amine function. One such "blocked" polyamine, is described in British patent specification No. 1,400,921. One commercially available example of such a substance is that sold under the Trade Mark "Caytur" 21 by E. I. du Pont de Nemours, which is described as an adduct of 4,4'-methylene-bis-aniline and sodium chloride, and is sold as a 50% dispersion in dioctyl phthalate. Use of this substance in the present compositions gives a rapid cure in the temperature range of 70° to 120° C.

Another suitable "blocked" polyamine is a methyl isobutyl ketimine derivative of 4,4'-methylene-bis-aniline formed by the reaction of methyl isobutyl ketone with 4,4'-methylene-bis-aniline under reflux in the presence of acetic acid for 8 hours. This "blocked" polyamine is stable in the absence of moisture, and when an adhesive composition of the present invention incorporating this "blocked" polyamine as the curing agent is applied to paper and heated, the equilibrium moisture content of the paper is sufficient to ensure a rapid cure.

Other examples of suitable curing agents include diethylene glycol, triethylenediamine, tetramethylendiamine, triethanolamine, diethyleneglycol/tetramethylenediamine in combination, triethanolamine formate, triethylenediamine diformate and tetramethylenediamine diformate.

The proportions of curing agent and catalyst (if any) are adjusted in order to obtain a suitable reaction rate and also the desired physical properties in the cured composition. Thus, a high cross-linking density may be attained by using stoichiometric proportions of curing agent, resulting in high cohesive strength of the cured composition. Less than stoichiometric proportions results in a reduced cross-linking density, and, accordingly an increased adhesive strength.

Provided that the presence of the tackifying resin does not have an unduly adverse effect on the maleinization of the liquid polybutadiene, or is not adversely affected itself, it may be present during maleinization at least in part. In other respects this step will be as previously described above. It will be appreciated that the tackifying resin may itself react with maleic anhydride, for example if it contains olefinic unsaturation, but, provided the tackifying properties are not unduly impaired, such a reaction will not be detrimental. As in the case of liquid solvents, diluents or plasticizers also present, the tackifying resin should preferably be inert towards the anhydride structure.

The remainder, if any, of the solid tackifying resin is added in the same way that the curing agent and catalyst are added.

It is to be appreciated that apart from the compounding steps specifically described above in which one of the ingredients of the composition is added, other compounding steps may be employed in order to formulate the compositions with other ingredients, such as pigments, fillers, antioxidants, biocides, odorants and other ingredients conventional in adhesive compositions.

The invention will now be illustrated by the following examples:

EXAMPLE 1

Preparation of Liquid Polybutadiene

A narrow molecular weight distribution, liquid polybutadiene is prepared using the following recipe and procedure:

| Reagents: | |
|---|---|
| Dry Toluene | - 1500 g. |
| 15 wt. % n-Butyl Lithium | - 185 ml. (0.3 moles) |
| Dry Tetrahydrofuran | - 12.3 ml. (0.15 moles) |
| Dry Butadiene | - 1500 g. |
| Glacial Actetic Acid | - 17.1 ml. (0.3 moles) |

The toluene is charged to a 5 liter reactor which has been purged with nitrogen and which is equipped with a stirrer, a butadiene inlet tube, a temperature probe, and a condenser adapted to be cooled using a solid carbon dioxide/methanol mixture. The temperature is raised to 50° to 55° C., the tetrahydrofuran and n-butyl lithium are charged, and the addition of butadiene is commenced at a rate of ca. 8.5 g./min.. By external cooling, the temperature is maintained at 50° to 55° C. After 3 hours, the addition of butadiene is stopped, the glacial acetic acid is added, and the polymerization mixture cooled to ambient temperature.

Removal by filtration of the lithium acetate which is formed, and removal of the toluene by vacuum distillation, yields a clear, liquid polybutadiene having a molecular weight of 5,000, a viscosity of approximately 100 poise (25° C.), and a vinyl-1,2 microstructure content of approximately 45%.

EXAMPLE 2

Another polybutadiene is prepared substantially following the procedure described in Example 1 but in the absence of tetrahydrofuran, and this polybutadiene, has a molecular weight of 5,000, a viscosity of approximately 50 poise (25° C.), and a vinyl-1,2 content of approximately 15%.

EXAMPLE 3

Maleinization of Liquid Polybutadiene 2500 g. Polybutadiene prepared as described in Example 1 are charged to a 5 liter reaction vessel with 12.5 g. of an alylated aryl phosphite anioxidant and 250 g. xylene, and the mixture is heated to 120° C. under a nitrogen blanket with efficient stirring.

At this temperature 125 g. maleic anhydride are added, and the reaction mixture is then heated to 180° C. and held at this temperature for 5 hours. The resultant adduct is a clear amber liquid having a viscosity of 65 poise at 25° C., and an acid value of 24 mg. KOH/g.

EXAMPLE 4

To 51 parts by weight of the maleinized polybutadiene of Example 3 containing approximately 5% by weight of combined maleic anhydride, are added 3.2 parts by weight of a complex of methylene bis-aniline with sodium chloride of equivalent weight 219 ("Caytur" 21), and 0.13 parts of a phenolic antioxidant sold under the Trade Mark "Nonox" WSO.

Separately, 49 parts by weight of a polyterpene resin of ring and ball softening point approximately 85° C. ("Nirez" 1085) are dissolved in sufficient toluene to give a solution of 20 to 25% volatiles content. This solution is mixed with the blended polybutadiene to give a fluid adhesive composition which, when coated onto a filmic base to give a coating weight of 30 to 40 g./m.$^2$, cured in a hot air oven at 120° C. for 5 minutes and cooled, gives a tacky adhesive film which has a peel adhesion when peeled through 180° from a clean glass plate at a separation rate of 4 inches/minute of greater than 600 g. per inch width of film.

EXAMPLE 5

Example 4 was repeated using 2.6 parts by weight of the methyl isobutyl ketimine derivative of 4,4'-methylene-bis-aniline as a blocked polyamine curing agent instead of the 3.2 parts by weight of "Caytur" 21. The coated adhesive film cured in less than 1 minute at 70° C. in moist air.

EXAMPLE 6

Preparation of a Solvent-Free Tape Adhesive

The maleinized polybutadiene prepared as described in Example 3 is warmed to 150° C. under a pressure of 1 mm. Hg to remove the xylene, and to 45 grams of this material are added 45 g. of "Zonarez" 7115 polyterpene resin and 10 grams "Enerflex" 711 oil while the temperature is maintained at 130° C. with stirring for 5 minutes or until the additions are dissolved. The mixture is cooled to 65° C., and mixed with 3.9 g. of "Caytur" 21. The adhesive mixture is coated while warm onto a filmic base of 35 micron thickness to give a spread of 23-30 gm./m.$^2$ and cured in a hot air oven at 120° C. for 1 minute. The Peel Value tested as described in Example 4 is greater than 400 g./in. width and the Hold Value is greater than 50 hours. The Hold Value test comprises adhering an area of 1 square inch of tape onto a clean vertical glass plate, and attaching a load of 4 lb. weight, maintaining an ambient temperature of 20° C. ± ½° C. and a relative humidity of 65% ± 1%, and recording the time taken for the adhesion of the tape to fail.

EXAMPLE 7

Preparation of a Label Adhesive Composition using Solid and Liquid Tackifiers

To 35 grams of the maleinized polybutadiene prepared as described in Example 3 are added 72.5 g. of an 80% w/w solution of a hydrogenated rosin ester sold under the Trade Mark "Floral" 105, dissolved in toluene as a solvent and 7 g. of a liquid methyl ester of hydrogenated rosin sold under the Trade Mark "Hercolyn" D and mixed. To this mixture are added 1.7 g. of "Caytur" 21 to give an adhesive composition which, when coated onto one side of a label stock paper to give a coating weight of about 30 g./m.$^2$, and cured in a hot air oven for 1 minute at 120° C., give an adhesive label material. This material when tested as in the foregoing Examples gives a Peel Value of greater than 1500 g./inch, the value being not precisely measurable because of the splitting of the paper stock. The Hold Value is from 20 minutes to 30 minutes when tested as in Example 5.

What we claim is:

1. A pressure-sensitive adhesive composition comprising a blend of:
   (a) the reaction product of maleic anhydride and a liquid polymer comprising at least a major proportion of butadiene, said reaction product comprising intact maleic anhydride units randomly distributed on the liquid polymer structure;
   (b) at least one solid tackifier resin;
   (c) at least one curing agent; and
   (d) less than 20% by weight of volatile liquid.

2. A composition as claimed in claim 1, wherein the composition comprises a curing catalyst.

3. A composition as claimed in claim 1, wherein the volatile liquid is water.

4. A composition as claimed in claim 1, wherein the volatile liquid is an organic solvent for the tackifying resin(s).

5. A composition as claimed in claim 1, wherein, prior to maleinization, the average molecular weight of the liquid polybutadiene was 500 to 20,000.

6. A composition as claimed in claim 1, wherein, prior to maleinization, the average molecular weight of the liquid polybutadiene was 1,000 to 10,000.

7. A composition as claimed in claim 1, wherein, prior to maleinization, at least 45% of the units of the liquid polybutadiene were in the 1,4-configuration.

8. A composition as claimed in claim 1, wherein the tackifying resin(s) comprise(s) from 5 to 75% by weight of the composition.

9. A composition as claimed in claim 1, wherein the tackifying resin(s) comprise(s) from 25 to 55% by weight of the composition.

10. A composition as claimed in claim 1, wherein the curing agent is a blocked polyamine.

11. A composition as claimed in claim 1, wherein the composition additionally comprises one or more pigments, fillers, antioxidants, biocides, ordorants and other ingredients conventional in adhesive compositions.

12. A composition as claimed in claim 1, wherein the amount of maleic anhydride present provides from 1 to 6 anhydride groups per polybutadiene macromolecule.

13. A composition as claimed in claim 1, wherein said curing agent is a polyol.

14. A composition as claimed in claim 1, wherein said curing agent is an amide.

15. A composition as claimed in claim 1, wherein said curing agent is an alkanol amine.

16. A composition as claimed in claim 1, wherein said curing agent is an alkanol amide.

17. A process for preparing a pressure-sensitive adhesive composition comprising the steps of:
   (a) preparing a liquid polymer comprising at least a major proportion of butadiene;
   (b) reacting said liquid polymer with maleic anhydride in the absence of oxygen and ring opening substances to provide a reaction product comprising intact maleic anhydride units randomly distributed on the liquid polymer structure; and
   (c) blending said reaction product with at least one tackifier resin, and at least one curing agent to provide a composition containing less than 20% by weight of volatile liquid.

18. The process claimed in claim 17, wherein the liquid polybutadiene is maleinized in the presence of some or all of the tackifying resin(s), whereafter the remainder, if any, of the tackifying resin(s) and the curing agent(s) are blended with the maleinized material.

19. A process as claimed in claim 17, wherein one or more curing catalysts is blended into the composition.

20. A process as claimed in claim 17, wherein the average molecular weight of the liquid polybutadiene is 500 to 20,000.

21. A process as claimed in claim 17, wherein the average molecular weight of the liquid polybutadiene is 1,000 to 10,000.

22. A process as claimed in claim 17, wherein at least 45% of the liquid polybutadiene has the 1,4-configuration.

23. A process as claimed in claim 17, wherein the amount of maleic anydride employed in the maleinization is sufficient to provide from 1 to 6 anhydride groups per polybutadiene macromolecule.

24. A process as claimed in claim 17, wherein the amount of maleic anhydride employed in the maleinization is sufficient to provide from 1 to 3 anhydride groups per polybutadiene macromolecule.

25. A process as claimed in claim 17, wherein the curing agent is a blocked polyamine.

26. A process as claimed in claim 17, wherein said curing agent is polyol.

27. A process as claimed in claim 17, wherein said curing agent is an amide.

28. A process as claimed in claim 17, wherein said curing agent is an alkanol amine.

29. A process as claimed in claim 17, wherein said curing agent is an alkanol amide.

* * * * *